May 9, 1939.  J. MERCIER  2,157,299
PACKING DEVICE, STUFFING BOX, AND THE LIKE
Filed Oct. 31, 1936  2 Sheets-Sheet 1

Jean Mercier
INVENTOR
By Otto Munk
his ATTY.

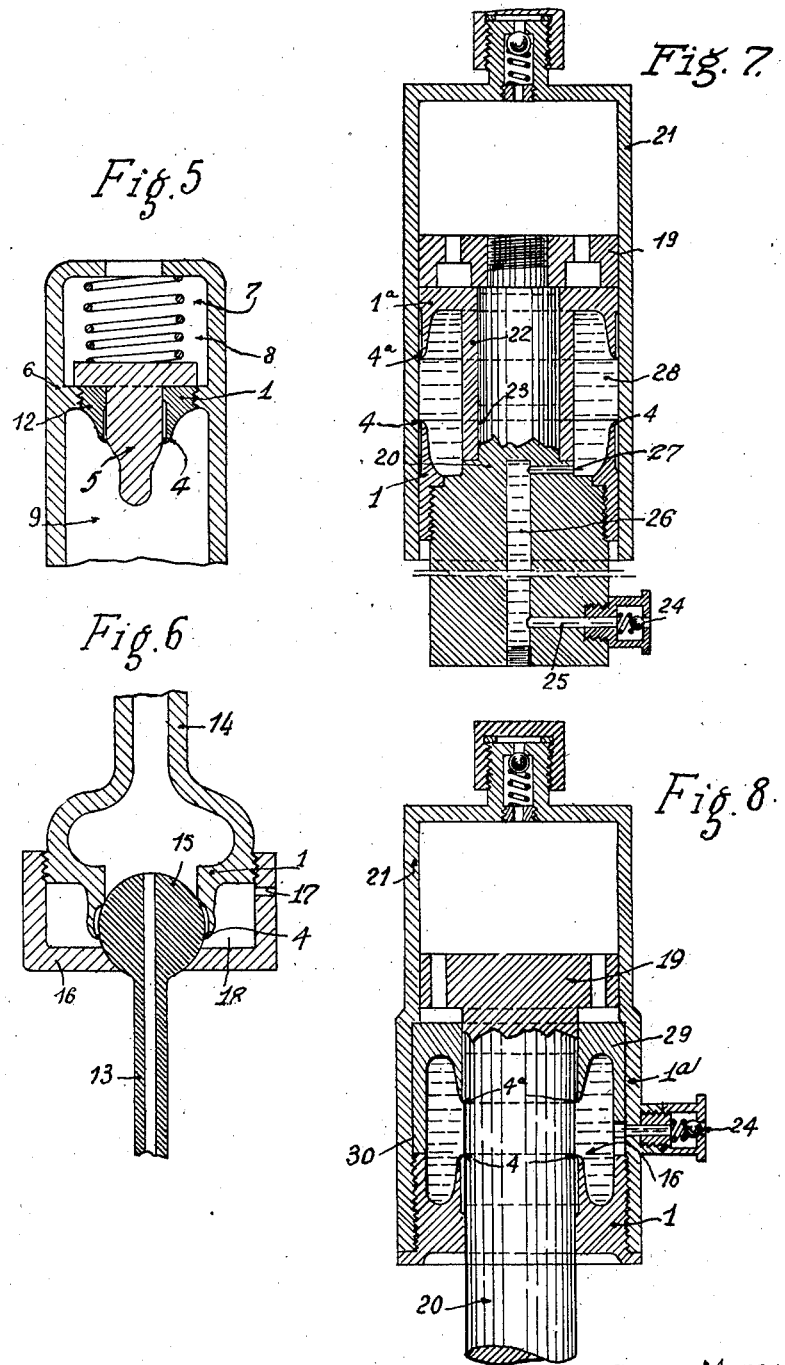

Patented May 9, 1939

2,157,299

UNITED STATES PATENT OFFICE 2,157,299

PACKING DEVICE, STUFFING BOX, AND THE LIKE

Jean Mercier, Neuilly-sur-Seine, France

Application October 31, 1936, Serial No. 108,523
In Belgium November 5, 1935

13 Claims. (Cl. 309—33)

Packing pieces of the scraper type are in current use, which comprise an annular elastic lip, adapted to fit against the concave internal surface of a cylinder or the external surface of a cylindrical rod, in order to form a tight joint between two adjacent chambers. In the joints of this type, the chamber to be separated in which the highest pressure prevails, will act directly upon the said elastic lip in order to press it strongly against the convex or concave wall co-operating with the scraping packing in order to form the joint.

However, in the case in which the joint operates at pressures which are low with reference to the rigidity of the packing piece, or at differences of pressure which pass through zero, such pressures may not be sufficient to apply the elastic lip against the convex or concave surface, and thus the tightness may be quite defective, and it will be necessary to find another method for obtaining the proper tightness. On the other hand, this tightness must be maintained, in spite of the wear resulting from a continued use. If, on the contrary, a very flexible lip should be employed, this lip will be applied, for a considerable height, against the said wall, thus giving rise to friction which will cause the wear of the packing and a resistance to movement.

The present invention relates to a packing piece, cap, cup or piston ring, which is elastic and acts as a scraper, this being so constructed as to ensure a perfect tightness, even after wear, and at all pressures, even when small or of zero value, or even when slightly negative. The said packing is chiefly characterized by the fact that on the one hand, its contact surface is relieved, starting from the centering base for nearly the entire height of the packing piece, in such way as to provide upon its free edge a narrow band of reduced height having a strong pressure of contact, and on the other hand, before the assembling, the diameter of the said band is such that the free edge of the packing will be subject to elastic deformation when in contact with the convex or concave surface upon which it is applied, thus ensuring a strong elastic pressure of this free edge upon the said surface, and hence a perfect contact.

In other words, the diameter, in the free state, of the narrow band of contact of the packing will be somewhat less than the diameter of the convex surface or somewhat greater than the diameter of the concave surface upon which the said band is applied.

According to another characteristic, the top part of the said free contact edge of the packing consists of a tapered surface whose half-angle at the top is preferably between 30° and 60°, so that this edge will form a veritable cutting edge. Thus the said cutting edge will have a bevelled section such that in spite of wear, its acting angle will not be changed, and will remain equal to the half-angle at the top of the cone above mentioned.

In the accompanying drawings, which are given solely by way of example:

Fig. 5 is a section of a valve provided with a scraping packing piece in conformity with the invention.

Figs. 6, 7 and 8 are analogous sections, respectively of a tight ball-piece and of two stuffing-boxes, provided with the said packing.

Figure 1:
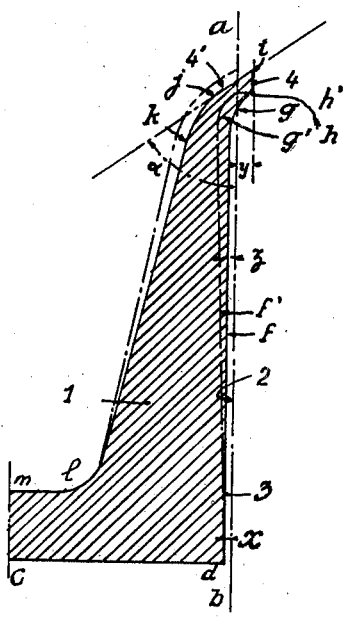
Fig. 1 is a radial section, on a large scale, of a scraping packing piece (cap, cup or piston ring) in accordance with the invention; this figure shows, in dot-and-dash lines, the position taken by the packing piece when its sharp edge bears against the surface with which it makes elastic contact.

In the embodiment shown in Fig. 1, the scraping packing piece 1, of which only a radial section is represented, is adapted to rub, with its right-hand face against a cylindrical surface 2 ($a$—$b$). This surface 2 may be concave (the surface of a cylinder) or convex (the surface of a rod). According to one or the other case, Fig. 1 thus represents the right or left-hand half-section of the ring which is formed by the entire packing piece.

The said packing piece consists of a base part $c$—$d$—$e$—$l$—$m$, of rectangular or like section, which is rigid with a resilient wall $e$—$f$—$g$—$h$—$i$—$j$—$k$—$l$. The said wall terminates at the end opposite the base with a lip 4 ($g$—$h$—$i$—$j$). The free edge of the lip 4 which will make contact with the surface 2 is very narrow, for instance about 1 millimetre or less, or even a zero value, for a diameter less than 50 mm. The upper surface $i$—$j$ of the lip 4 of the packing piece is a tapered surface whose half-angle $\alpha$ at the top, is preferably comprised between 30° and 60°. The tapered surface $ij$ is connected with the base by a junction part $jk$, and by a surface $kl$ of radial section, which may be rectilinear or not. The surface $kl$ is inclined from the axis of the packing piece, i. e., from $ab$, in such way that the resilient wall will become thinner from the base to the lip of the packing piece.

The radius of the surface $de$ of the base part corresponds, save for a very slight assembling play $x$ (more or less according to the case), to the radius of the surface 2. The radius of the surface $hi$ of the free edge of the lip 4, is less than (if the surface 2 is convex) or greater than (if the surface 2 is concave) the diameter of this surface, by a certain quantity $y$, for instance a few tenths of a millimeter for a surface $z$ having 50 mm. diameter.

It will be observed that the element having the surface 2 cannot be engaged in the packing piece I, or inversely, except by an elastic deformation of the resilient wall portion which then takes the position shown in the dot-and-dash lines, so that the lip edge 4 will assume the position 4'. Obviously, the deformation 4—4' should not exceed the elastic limit of the metal.

It will be remarked that the surface $hi$ of the lip edge 4 is in elastic contact with the wall 2 with a force corresponding to the greatness of the elastic deformation 4—4' during the assembling operation.

The lip edge 4 of the packing piece forms a veritable cutting edge at $i$, which scrapes upon the surface 2 during the longitudinal movements of this surface relatively to the packing piece, thus ensuring a perfect tightness between these two parts.

It is further observed that the deformation 4—4' gives rise to a space between the resilient wall portion of the packing piece and the wall 2 $(a-b)$, at $h'-g'-f'-e$. The average depth $z$ of this space, and the rigidity of the resilient wall portion should be sufficient to provide for a very easy slipping at the highest pressures employed, i. e., even at the highest pressures, only the free edge of the lip 4 should be in contact with the surface $a-b$.

Figure 2:
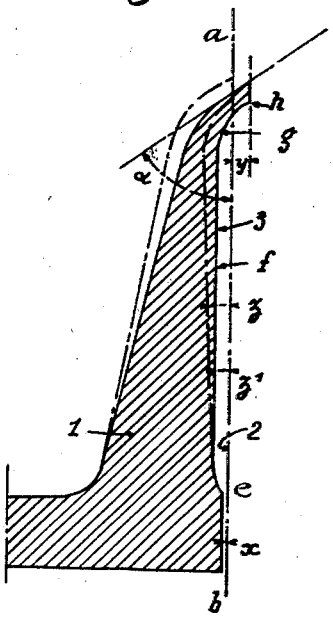
Figs. 2 and 3 are sections of modified forms of packing pieces according to the invention.

The space having the depth $z$ may be increased, if desired, by a slight recess 3, in the idle position, starting from the said base part, as shown in Fig. 2. The depth $z'$ of this recess may be a few hundredths of a millimeter, or none.

Obviously, the dimensions $x$, $y$, $z$, $z'$ in Figs. 1 and 2 are much exaggerated for the sake of clearness.

The base of the packing piece need not be formed in one with this piece, but it may be separately secured to it by screwing or otherwise, so that it may be made of any other metal, or of an alloy or the like, which is found to be more suitable.

Aside from the conditions of diameter above mentioned, the whole device must comply with other conditions.

The resilient wall portion should be sufficiently thin to permit the elastic deformation 4—4' above mentioned. Its thickness, however, should be sufficient to provide for the resistance to pressure, while only maintaining the close contact in proximity to the sharp lip edge $i$ upon a small height $ih$ (a height less than 1 mm. for instance, for a diameter below 50 mm.). On the other hand, the altitude $ei$ of the wall portion should be sufficient in order that, taking due account of its thickness, the elastic contact of the sharp edge shall be maintained at all pressure in use.

The metals in contact should have suitable friction properties in order to avoid gripping, since the scraping expels the oil. On the other hand, the macrographic grain and the mechanical strength of the metal used for the packing should permit the formation of a sharp edge, and for this reason, use will be made of a metal which is sufficiently elastic, perfectly homogeneous, and has a very compact structure. The wall comprising the surface 2 should consist of a material having a very close macrographic grain, which allows a perfect polish and is sufficiently hard not to be scratched by the sharp edge I of the packing.

For a packing piece I of great strength ($R>50$ kgs. $A>10\%$), the Brinell-Vickers hardness of the surface layer of the wall 2 should exceed 200°, and the under layer should have a sufficient strength to withstand the stresses which apply the edge 4 against the wall 2. Use can be made, for instance, of a wall consisting of nitrided steel, of chrome steel or of cement steel.

These conditions being obtained, the principal advantages of the device are as follows:

The friction is very slight, especially as compared with that of stuffing-boxes or even of the plastic packings in current use.

The tightness for oil is ensured at very high pressures, exceeding 1,000 kgs. per sq. cm.

Even after a long period of stopping, when the apparatus is again started, there is no danger that the packing I will be torn off, as is the case with india-rubber packing.

The insignificant wear which is produced during a long period will offer no prejudice to the tight conditions, as the different successive sections of the edge 4 are parallel with $i'h'$ and hence will not modify the angle $\alpha$ of the sharp edge.

Figure 3:
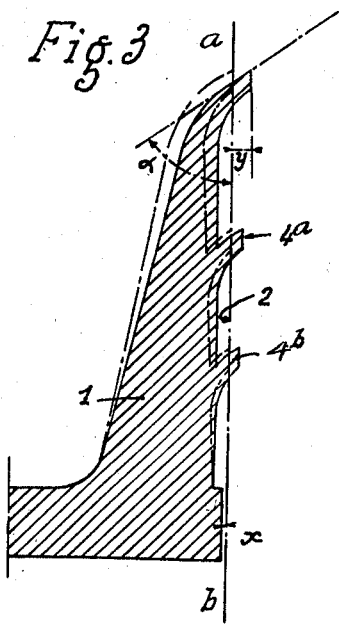

Fig. 3 represents a modification which is provided with auxiliary lips 4—4, whose projection with reference to $ab$ is of decreasing value, in such way that all of their sharp edges will be in elastic contact with this wall after the assembling (see the position in the dot-and-dash lines).

Figure 4:
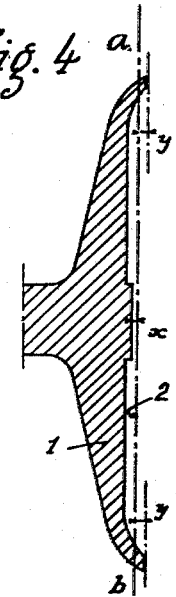
Fig. 4 is a section of another modification comprising two sharp edges in opposite situation.

Fig. 4 shows a packing piece having two symmetric resilient wall portions and lips which are located on opposite sides of a central base. This packing piece is double-acting.

A description will now be given, by way of example of certain uses of the packing (cap, cup or piston-ring) according to the invention.

In the embodiment shown in Fig. 5, a valve 5 is urged upon its seating 6 by a spring 7. In order to ensure perfect tightness between the two chambers 8 and 9 which are separated by said valve, a packing piece I, which is screwed or otherwise secured to the seating 6, comprises a resilient annular element recessed below its base part, and a lip 4 forming a cutting edge which before the assembling, has a diameter less than that of the cylindrical part 12 of the main body of the valve. Thus when the valve 5 and the packing piece I are put in place, in the position shown in Fig. 5, the sharp lip edge 4 of the packing piece will be in close contact with the body of the valve. This ensures perfect tightness of the valve. The lip of the packing piece is preferably directed towards the chamber, 8 or 9, having the highest pressure, in order that this pressure, by its effect upon the lip and resilient wall portion of the packing, will act to further increase the tightness.

In the embodiment shown in Fig. 6, it is desired to make a tight connection between two conduits 13 and 14 which are connected by a ball-piece 15. For this purpose, a packing piece which is integral with the conduit 4 or is separately secured to the same is provided with a resilient annular portion having an inwardly inclined lip 4 forming a cutting edge, which before the assembling, has a smaller diameter than the ball 15. A nut 16 is screwed to the part 14—1, and holds the different elements together. If it is desired, for instance, to maintain a vacuum in the conduits 13 and 14, an orifice 17 in the nut 16 will allow the outer air to enter the chamber 18 formed in the interior of the nut, and the atmospheric pressure acting upon the resilient wall portion and lip of the packing piece 1 will strongly apply the edge 4 of the said lip against the ball 15.

In the embodiment shown in Fig. 7, a piston 19 provided with a rod 20 is movable in the cylinder 21. A metallic packing ring 1, secured to the said rod 20, comprises a resilient annular sleeve, terminating at its thinnest part in an outwardly inclined lip 4 forming a cutting edge, which, before assembling, has a larger diameter than the inner surface of the cylinder 21. On the rod 20, there is mounted a second metallic packing ring 1ª, provided with a cutting edge 4, in elastic contact with the cylinder. A sleeve 22 supports said second packing ring on a thinner portion 23 of the rod 20. A fluid is introduced through a valve 24 and the conduits 25—26—27 of the rod 20, and fills the space 28 between the packing rings 1ª and 1, the cylinder 21, and the rod 20. As the cutting edges 4 and 4ª have normally a larger diameter than the cylinder 21, these edges will always be closely applied against the inner surface of the cylinder and will ensure a perfect tightness between the piston and the cylinder.

In the construction represented in Fig. 8, the piston 10 is provided with a rod 20 and is movable in the cylinder 21, as before, but in this case the metallic packing ring 1 is secured to the cylinder and is provided with a lip edge 4 which, before assembling, has a smaller diameter than the rod 20. The cylinder 3 contains, between a shoulder 29 of this cylinder and a projecting part 30 of the packing ring 1, a second packing ring 1ª which is secured to the cylinder and whose cutting edge 4ª has, before the assembling, a smaller diameter than the rod 20. A fluid is introduced through the valve 24, and fills the space between the packing rings 1 and 1ª, the cylinder 21 and the rod 20. The differences between the diameters of the edges 4 and 4ª and the diameter of the rod 20, will ensure a perfect tightness between the piston rod and the cylinder.

Obviously, the said invention is not limited to the embodiments and the uses herein set forth, and these have been chosen simply by way of example. The invention is applicable to all apparatus employing packing pieces of the scraper type.

Having now described my invention, what I claim as new and desire to secure by Letters Patent, is:

1. A scraping metal packing comprising a resilient wall portion of elongated, substantially triangular cross-section, and a sealing lip extending from the thinnest and most resilient part of said wall portion and being bent over one surface of the latter at an inclined angle relative to the altitude of said triangle, the free edge of said sealing lip projecting beyond an imaginary plane extending parallel to said altitude through said adjacent surface at the thick end of said wall portion.

2. A scraping metal packing comprising a resilient wall portion of elongated, substantially triangular cross-section, one surface of said wall portion being disposed substantially parallel to the altitude of said triangle, and a sealing lip extending from the thinnest and most resilient part of said wall portion and being bent at an inclined angle towards said surface, the free edge of said sealing lip projecting beyond said surface.

3. A scraping metal packing as claimed in claim 2, in which said parallel surface is recessed substantially throughout its height.

4. A metal packing for cylinders and the like, comprising a resilient sleeve of graduated thickness, and a sealing lip extending from the thinnest and most resilient parts of said sleeve at an inclined angle relative to the sleeve axis, the free edge of said sealing lip projecting beyond the periphery of the adjacent sleeve surface at the thick end of the sleeve.

5. A packing as claimed in claim 4, comprising at least one auxiliary sealing lip provided on said adjacent surface between the thick and the thin end of the sleeve, the free edge of said auxiliary lip projecting beyond said periphery to a less extent than the free edge of said first lip.

6. A packing as claimed in claim 4, comprising a second sleeve and lip symmetric with said first sleeve and lip, said two sleeves being joined at their thick ends and extending in opposite directions.

7. A metal packing for cylinders and the like, comprising a resilient sleeve of graduated thickness, a base extending radially in one direction from the thickest part of the sleeve, and a sealing lip extending from the thinnest and most resilient part of said sleeve at an inclined angle relative to the sleeve axis substantially in a radial direction opposite to that of said base, the free edge of said sealing lip projecting beyond the periphery of the adjacent sleeve surface at the thick end of the sleeve.

8. A metal packing for cylinders and the like, comprising a resilient sleeve of graduated thickness, and a sealing lip extending from the thinnest and most resilient part of said sleeve outwardly at an inclined angle relative to the sleeve axis, the free edge of said sealing lip projecting beyond the greatest periphery of said sleeve.

9. A packing as claimed in claim 8, in which the outer sleeve surface extends substantially parallel to the sleeve axis.

10. In combination with two machine elements having opposed surfaces, a metal packing comprising a base mounted on one of said elements, an inclined lip applied resiliently to the surface of the other element, and a resilient wall portion connecting said lip and base, said resilient wall portion extending freely between said opposed surfaces, and having a thickness gradually increasing from lip to base.

11. In combination with two machine elements having curved surfaces surrounding one another, a sleeve-shaped scraping metal packing ring, comprising an annular base mounted on one of said elements, a lip disposed at an inclined angle relative to the sleeve axis and having its free edge resiliently applied to the surface of the other element, and a resilient sleeve portion connecting said lip and base, said resilient sleeve portion extending freely between said surfaces, and having a thickness gradually increasing from lip to base.

12. A combination as claimed in claim 11, comprising a second sleeve-shaped packing ring symmetric with and mounted on the same element as said first ring, the lip ends of both rings facing one another.

13. In combination with a cylinder and a piston, a sleeve-shaped scraping metal packing ring, comprising an annular base mounted on the piston, a lip disposed at an outwardly inclined angle relative to the sleeve axis and having its free edge resiliently applied to the cylinder wall, and a resilient sleeve portion connecting said lip and base, said resilient sleeve portion extending freely between cylinder and piston and having a thickness gradually increasing from lip to base.

JEAN MERCIER.